United States Patent [19]

Fink

[11] Patent Number: 5,759,677
[45] Date of Patent: Jun. 2, 1998

[54] ARTICLE OF MANUFACTURE HAVING AT LEAST IN PART THE SURFACE APPEARANCE OF BRASS WITH A CERAMIC BARRIER COATING

[75] Inventor: Klaus Fink, Northfield, Ohio

[73] Assignee: Moec Incorporated, North Olmsted, Ohio

[21] Appl. No.: 664,292

[22] Filed: Jun. 11, 1996

[51] Int. Cl.$^6$ ............................................... B32B 15/04
[52] U.S. Cl. .......................... 428/216; 438/457; 438/469; 438/336; 438/701; 438/702; 438/698
[58] Field of Search ........................ 428/216, 336, 428/457, 469, 701, 698, 702

[56] References Cited

U.S. PATENT DOCUMENTS

| | | |
|---|---|---|
| 2,972,543 | 2/1961 | Beals et al. |
| 3,885,855 | 5/1975 | Gross ........................... 359/359 |
| 4,980,236 | 12/1990 | Oomen et al. |
| 5,264,297 | 11/1993 | Jindal et al. |
| 5,472,795 | 12/1995 | Atita |
| 5,484,663 | 1/1996 | Moysan, III et al. |

FOREIGN PATENT DOCUMENTS 242748   10/1988   Japan.

Primary Examiner—Archene Turner
Attorney, Agent, or Firm—Dorn, McEachran, Jambor & Keating

[57] ABSTRACT

An article of manufacture having at least in part the surface appearance of brass includes a ceramic barrier coating applied to a base layer of Cu/Ni/Cr. The ceramic barrier coating includes an initial layer of ZrCn and an additional layer which is a nitrite, carbide or oxide of Zr, Ti, Si, Al or Hf.

12 Claims, No Drawings

ARTICLE OF MANUFACTURE HAVING AT LEAST IN PART THE SURFACE APPEARANCE OF BRASS WITH A CERAMIC BARRIER COATING

THE FIELD OF THE INVENTION

The present invention relates to ceramic coatings for hardware products, primarily plumbing products, but also other hardware products in which it is desirable to have a brass appearing finish. Specifically, brass appearing products such as faucets, faucet spouts, shower heads, door knobs, lock sets and the like are popular. Consumers demand a product which has the color and shine of an original brass finish, but they also require a product which is mechanically durable and resistant to a wide range of household cleaning agents.

A product which is to have the appearance of brass will conventionally consist of a substrate to which is applied an electroplated surface via the deposition of Cu/Ni/Cr. In order to match the original brass color, a zirconium carbon nitride (ZrCN) is applied to the plated substrate. The ZrCN coating provides a high degree of controllability in production and excellent mechanical performance. Unfortunately, this coating may be inadequately resistant to attack by high strength cleaners, specifically strong caustics, causing a black stain. Therefore, it may fail to meet the desired expectations of the consumer. What is required is an additional coating or lamination applied with the ZrCN and which is chemically resistant to the traditional cleaners that are used on hardware fixtures. The total coating must be brass colored, i.e., the brass appearance of the ZrCN must be visible, and the laminate must not significantly affect the physical properties achieved by the original ZrCN.

The present invention provides a ceramic barrier coating against chemical damage which includes the described ZrCN film and an additional lamination somewhere within the film which is a nitride, carbide or oxide of Zr, Ti, Si, Al or Hf.

SUMMARY OF THE INVENTION

The present invention relates to articles of manufacture having the appearance of brass with a ceramic barrier coating to resist attack by high strength cleaners commonly used on fixtures and hardware in a home/light industrial environment.

A primary purpose of the invention is a ceramic barrier coating which has the appearance of brass and which is resistant to chemicals used in the described environments.

Another purpose of the invention is to provide a reliable brass appearing product which has a ceramic barrier coating which is resistant to the customary household cleaners.

Another purpose is to provide a ceramic barrier coating comprised of ZrCN as the base brass appearing layer, which base layer contains a thin lamination of a nitride, carbide or oxide of Zr, Ti, Si, Al or Hf somewhere within its cross section.

Another purpose of the invention is to provide a laminated ceramic coating for the use described in which the additional layer is chosen from one of the group of TiN; $TiO_2$; $ZrO_2$; or $SiO_2$.

Another purpose of the invention is to provide a laminated barrier coating which consists of four separate laminations, the resultant product having the appearance and durability of brass, with the third layer being formed of TiN, the second and fourth layers being formed of ZrCN.

Other purposes will appear in the ensuing specification and claims.

DESCRIPTION OF THE PREFERRED EMBODIMENT

The present invention relates to an article of manufacture such as a plumbing or a hardware product, for example door hardware, which has a durable brass-appearing finish. Such plumbing products may include tub spouts, faucet spouts, shower heads, faucets and bathroom accessories if a desired accessory is to have the appearance of brass. Specifically, the invention is directed toward providing a mechanically durable, chemically resistant brass appearing finish which consists of laminations of ceramic compounds.

The substrate, which may be any of the products described above, may first be electroplated. In order to provide the desired brass appearance, a lamination or coating of ZrCN will be applied by physical vapor deposition, in the arc or sputter mode, in a thickness of from 200 to 1,000 nanometers, with on the order of about 300 nanometers being the preferred thickness in arc mode for the brass appearing ZrCN. This physical vapor deposition process may be performed by a Hauzer HTC-1000 manufactured by Hauzer TechnoCoating Europe BV, located in Holland. The machine will use zirconium targets and operate with the following parameters for the ZrCn lamination:

Nitrogen flow rate=1000 sccm
Bias voltage=60 V
Pump speed=50%
Acetylene flow rate=7 sccm
Target current=2×80A
Temp=150° C.
Deposition time=15 minutes To the second layer of ZrCn described above there will be a third layer which is a nitride, carbide or oxide of Zr, Ti, Si, Al or Hf. This layer will also be applied using the same equipment as described above, although different gas sources and different targets will be utilized; the deposition may be done either in arc mode or sputter mode. More preferably, the third layer is selected from one of the group of $ZrO_2$; TiN; $TiO_2$; $SiO_2$; $Al2O_3$; AlN or HfN. The thickness of the third layer will be from 2 to 10 nanometers with a preferred thickness being generally on the order of about 5 nanometers. A most preferred layer is TiN which may be applied by the same Hauzer HTC-1000 using a titanium target and with the following machine operating parameters:

Nitrogen flow rate=1000 SSCM
Bias voltage=60 V
Pump speed=50%
Acetylene flow rate=0 SSCM
Target current-1×80A
Temp=150° C.
Deposition time=1 minute The above-described three-layer ceramic barrier coating for an article of manufacture such as a plumbing product has the appearance of brass and is resistant to household cleaners such as Drano and to most alkaline types of cleaning agents which may be used in the described environment.

As a further embodiment of the invention, there is a multilamination coating which begins with plating the substrate with Cu/Ni/Cr as described. To this first layer or lamination there will be applied by physical vapor deposition in the arc mode a lamination of ZrCN having a thickness of on the order of about 250 nanometers. The third layer will be titanium nitride having a thickness of between 10 to 30 nanometers. On top of the titanium nitride is applied a second lamination of ZrCN in a thickness of approximately 10 nanometers.

The above described products have the durability and appearance of brass, a desirable finish in both the hardware and plumbing fields. The finish is resistant to cleaners having either an alkaline or acid base and thus is highly desirable in the described environments.

Whereas the preferred form of the invention has been shown and described herein, it should be realized that there may be many modifications, substitutions and alterations thereto.

The embodiments of the invention in which an exclusive property or privilege is claimed are defined as follows:

1. An article of manufacture having at least in part the surface appearance of brass including a first substrate layer; a second layer of Zr/C/N; and a third layer which is a nitride, carbide or oxide of Zr, Ti, Si, Al or Hf, said second layer having a thickness of between 200 and 1,000 nanometers.

2. The article of manufacture of claim 1 wherein said third layer is selected from the group of $ZrO_2$; TiN; $TiO_2$; $SiO_2$; $Al_2O_3$; AlN; or HfN.

3. The article of manufacture of claim 2 wherein said third layer is $ZrO_2$.

4. The article of manufacture of claim 2 wherein said third layer is TiN.

5. The article of manufacture of claim 2 wherein said third layer is $TiO_2$.

6. The article of manufacture of claim 2 wherein said third layer is $SiO_2$.

7. The article of manufacture of claim 1 wherein said second layer has a thickness of on the order of about 300 nanometers.

8. The article of manufacture of claim 1 wherein said third layer has a thickness of from 2 to 10 nanometers.

9. The article of manufacture of claim 1 including a fourth layer of ZrCN.

10. The article of manufacture of claim 9 wherein said third layer is TiN.

11. The article of manufacture of claim 10 wherein said second layer has a thickness of on the order of about 250 nanometers; said third layer has a thickness of from 10 to 30 nanometers; and said fourth layer has a thickness of on the order of about 10 nanometers.

12. The article of manufacture of claim 1 wherein said first substrate layer is formed of Cu/Ni/Cr.

* * * * *